United States Patent
Yanagida et al.

(10) Patent No.: US 11,613,161 B2
(45) Date of Patent: Mar. 28, 2023

(54) VEHICLE AIR CONDITIONING SYSTEM AND AIR CONDITIONER CONTROL METHOD

(71) Applicant: Toyota Jidosha Kabushiki Kaisha, Toyota (JP)

(72) Inventors: Kenichi Yanagida, Toyota (JP); Tomoya Yamaguchi, Seto (JP); Yosuke Kimura, Nissin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 149 days.

(21) Appl. No.: 17/095,408

(22) Filed: Nov. 11, 2020

(65) Prior Publication Data

US 2021/0138871 A1    May 13, 2021

(30) Foreign Application Priority Data

Nov. 13, 2019 (JP) .............................. JP2019-205698

(51) Int. Cl.
*B60H 1/00* (2006.01)
*B60N 2/56* (2006.01)

(52) U.S. Cl.
CPC ....... *B60H 1/00807* (2013.01); *B60H 1/0073* (2019.05); *B60H 1/0075* (2013.01);
(Continued)

(58) Field of Classification Search
CPC   B60H 1/00807; B60H 1/0073; B60H 1/0075; B60H 1/00785; B60H 1/00771;
(Continued)

(56) References Cited

U.S. PATENT DOCUMENTS 5,400,963 A    3/1995   Ishikawa et al.
5,518,065 A    5/1996   Asou et al.
(Continued)

FOREIGN PATENT DOCUMENTS

JP    H05116521 A    5/1993
JP    0781372 B2     8/1995
(Continued)

*Primary Examiner* — Frantz F Jules
*Assistant Examiner* — Matthew John Moscola
(74) *Attorney, Agent, or Firm* — Dinsmore & Shohl LLP

(57) ABSTRACT

A vehicle air conditioning system, including: a vehicle interior environmental information acquisition unit that acquires environmental information of a vehicle interior; a vehicle exterior environmental information acquisition unit that acquires environmental information of surroundings of the vehicle; a sensible temperature prediction unit that predicts a sensible temperature of an occupant of the vehicle after a predetermined amount of time has elapsed, based on the environmental information acquired by the vehicle cabin interior environmental information acquisition unit and the vehicle cabin exterior environmental information acquisition unit; and an air conditioner controller that controls an air conditioner based on information regarding a future sensible temperature of the occupant which has been predicted by the sensible temperature prediction unit and a comfortable sensible temperature of the occupant which is stored in a storage unit.

6 Claims, 6 Drawing Sheets

(52) U.S. Cl.
CPC ..... *B60H 1/00785* (2013.01); *B60H 1/00285* (2013.01); *B60N 2/56* (2013.01)

(58) Field of Classification Search
CPC ............ B60H 1/00742; B60H 1/00892; B60H 1/00735; B60N 2/56
See application file for complete search history.

(56) References Cited

U.S. PATENT DOCUMENTS

| | | | |
|---|---|---|---|
| 5,603,226 | A | 2/1997 | Ishikawa et al. |
| 11,247,656 | B2* | 2/2022 | Kim ..................... B60H 1/3213 |
| 11,263,884 | B2* | 3/2022 | Grinberg ................ G08B 21/22 |
| 2018/0134116 | A1* | 5/2018 | Chen ..................... B60N 2/976 |
| 2018/0265094 | A1* | 9/2018 | Graney ................. B60W 40/08 |
| 2021/0031657 | A1* | 2/2021 | Sato ..................... H05B 1/0238 |
| 2021/0094388 | A1* | 4/2021 | Kakade ................... F28F 27/00 |
| 2021/0402847 | A1* | 12/2021 | De Pelsemaeker ......................... B60H 1/00671 |
| 2022/0009307 | A1* | 1/2022 | Neveu .................. G06V 40/103 |

FOREIGN PATENT DOCUMENTS

| | | |
|---|---|---|
| JP | 0789327 B2 | 9/1995 |
| JP | 2007-069713 A | 3/2007 |
| JP | 2010-036751 A | 2/2010 |

\* cited by examiner

FIG.4

| times of travel | set temperature | inside/outside air state | room temperature | humidity | outside air temperature | amount of solar radiation | amount of clothing | metabolic rate | sensible temperature |
|---|---|---|---|---|---|---|---|---|---|
| 1 | 25 | inside air circulation state | 26.1 | 42 | 30 | 10.1 | 0.6 | 1.1 | 26.4 |
| 2 | 25 | outside air introduction state | 26.5 | 39 | 28 | 13.4 | 0.7 | 1.0 | 27.1 |
| 3 | 24 | outside air introduction state | 25.5 | 35 | 32 | 9.3 | 0.6 | 1.1 | 25.5 |
| . | . | . | . | . | . | . | . | . | . |
| n | 22 | inside air circulation state | 23.8 | 40 | 34 | 15.2 | 1.0 | 1.2 | 24.8 |

FIG.5

| User No. | n1 | n2 | n3 | n4 | n5 | n6 | n7 | n8 | n9 | n10 |
|---|---|---|---|---|---|---|---|---|---|---|
| 1 | 26.4 | 26.4 | 26.4 | 26.4 | 26.4 | 26.4 | 26.4 | 26.4 | 26.4 | 26.4 |
| 2 | 27.0 | 27.0 | 27.0 | 27.0 | 27.0 | 27.0 | 27.0 | 27.0 | 27.0 | 27.0 |
| 3 | 25.8 | 25.8 | 25.8 | 25.8 | 25.8 | 25.8 | 25.8 | 25.8 | 25.8 | 25.8 |

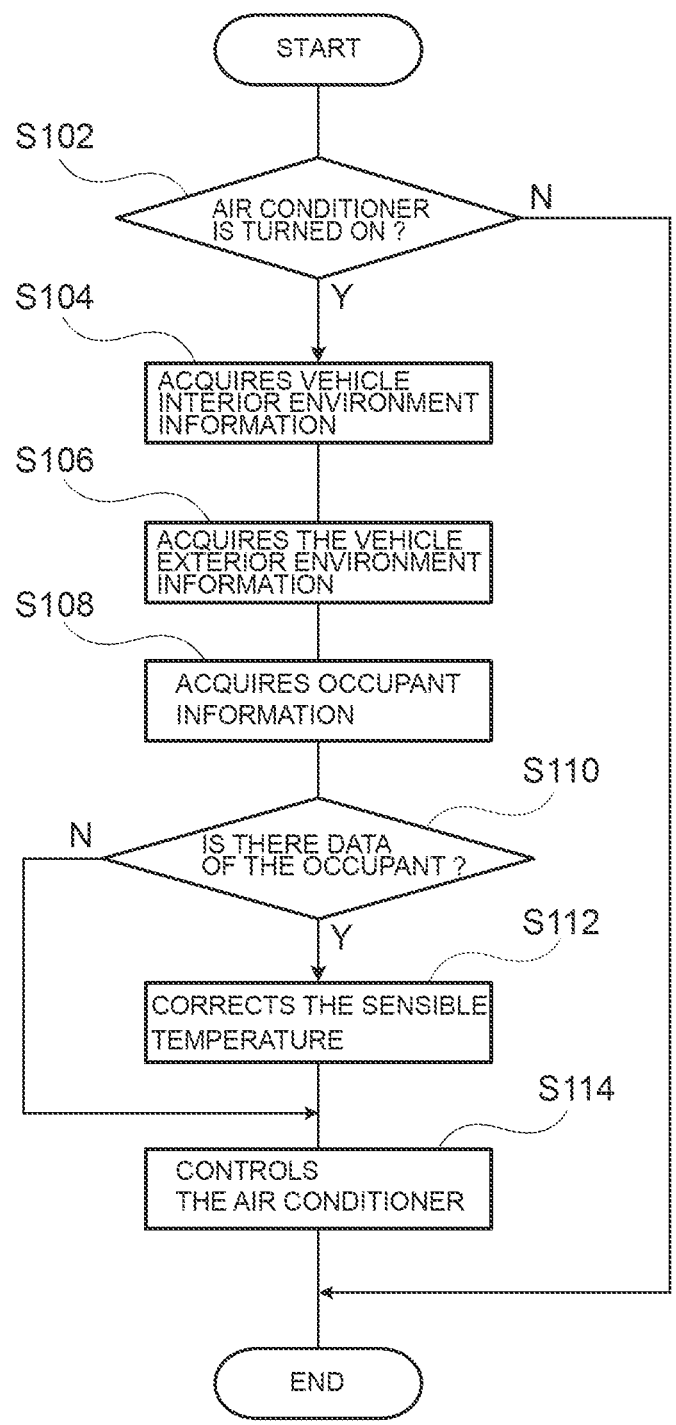

VEHICLE AIR CONDITIONING SYSTEM AND AIR CONDITIONER CONTROL METHOD

CROSS-REFERENCE TO RELATED APPLICATION

This application claims priority under 35 USC 119 from Japanese Patent Application No. 2019-205698, filed on Nov. 13, 2019, the disclosure of which is incorporated by reference herein.

BACKGROUND

Technical Field

The present disclosure relates to a vehicle air conditioning system and an air conditioning device control method.

Related Art

Japanese Patent Application Laid-Open (JP-A) No. H5-116521 discloses an air conditioner that maintains a passenger compartment temperature at a comfortable level by controlling an amount of blown air, and a temperature of the blown air, from the air conditioner. In Japanese Patent Application Laid-Open (JP-A) No. H5-116521, a comfort level of an occupant is calculated based on the temperature of the blown air, the amount of blown air, and environmental conditions.

However, in the air conditioner described in Patent Document 1, the air conditioner is controlled by calculating a current comfort level of the occupant. Further, since the temperature at which the occupant feels comfortable differs, the comfort of the occupant may be impaired when the environment changes.

SUMMARY

The present disclosure provides an air conditioning system for a vehicle and an air conditioner control method capable of maintaining good occupant comfort even when the environment changes.

In the vehicle air conditioning system according to a first aspect of the present disclosure, a vehicle interior environment information acquisition unit acquires environmental information of an interior of a vehicle. A vehicle exterior environment information acquisition unit acquires environmental information of surroundings of the vehicle. A sensible temperature prediction unit predicts a sensible temperature of an occupant of the vehicle after a predetermined amount of time has elapsed, based on the information acquired by the vehicle interior environmental information acquisition unit and the vehicle exterior environmental information acquisition unit. An air conditioner controller controls an air conditioner based on information regarding a future sensible temperature of the occupant which has been predicted by the sensible temperature prediction unit and a comfortable sensible temperature of the occupant which is stored in a storage unit.

In the first aspect of the present disclosure, environmental information of the interior of the vehicle is acquired by the vehicle interior environment information acquisition unit. Further, environmental information of surroundings of the vehicle is acquired by the vehicle exterior environmental information acquisition unit. In addition, the sensible temperature prediction unit predicts a sensible temperature of the occupant of the vehicle after a predetermined amount of time has elapsed, based on the information acquired by the vehicle interior environmental information acquisition unit and the vehicle exterior environmental information acquisition unit. By predicting the future sensible temperature of the occupant in this manner, it is possible to respond to environmental changes in advance.

Further, the storage unit stores information regarding a comfortable sensible temperature at which the occupant feels comfortable. The air conditioner controller controls the air conditioner based on information regarding a future sensible temperature of the occupant which has been predicted by the sensible temperature prediction unit and a comfortable sensible temperature of the occupant which is stored in the storage unit. In this manner, by controlling the air conditioner in consideration of the comfortable sensible temperature in addition to the future sensible temperature of the occupant which has been predicted, the sensible temperature at which the occupant feels comfortable can be maintained.

The vehicle air conditioning system according to a second aspect of the present disclosure, in the first aspect, further includes an occupant information acquisition unit that acquires information of at least one of an amount of clothing of the occupant or a metabolic rate of the occupant. Further, the sensible temperature prediction unit predicts the sensible temperature of the occupant after the predetermined amount of time has elapsed, based on the information acquired by the vehicle interior environmental information acquisition unit, the vehicle exterior environmental information acquisition unit, and occupant information acquisition unit.

In the second aspect of the present disclosure, the occupant information acquisition unit acquires information of at least one of the amount of clothing of the occupant or the metabolic rate of the occupant, and adds these pieces of information to predict the sensible temperature of the occupant after the predetermined amount of time has elapsed. Thereby, the setting of the air conditioner can be changed according to the condition of the occupant.

In the vehicle air conditioning system according to a third aspect of the present disclosure, in the first aspect or the second aspect, the vehicle exterior environmental information acquisition unit acquires information of at least one of an air temperature outside the vehicle, an amount of solar radiation, or information indicating time and location.

In the third aspect of the present disclosure, the vehicle exterior environment information acquisition unit acquires information of at least one of the air temperature outside the vehicle, the amount of solar radiation, or information indicating time and location as environmental information of surroundings of the vehicle. Then, the future sensible temperature of the occupant is predicted based on these pieces of information.

In the vehicle air conditioning system according to a fourth aspect of the present disclosure, in any one of the first aspect to the third aspect, the vehicle interior environmental information acquisition unit acquires information of at least one of a temperature of the interior of the vehicle, an air conditioning setting temperature, a state of air inside and outside the vehicle, an air conditioning air flow, a state of an outlet, humidity, a setting temperature of a seat heater, or an open/closed state of a window.

In the fourth aspect of the present disclosure, the vehicle interior environment information acquisition unit acquires information of at least one of the temperature of the interior of the vehicle, the air conditioning setting temperature, the state of air inside and outside the vehicle, the air conditioning air flow, the state of an outlet, humidity, the setting temperature of a seat heater, or the open/closed state of a windows as environmental information of the interior of the vehicle. Then, the future sensible temperature of the occupant is predicted based on these pieces of information. Here, the state of the air inside and outside the vehicle refers to the outside air introduction state and the inside air circulation state. Further, here, the state of an outlet refers to the opening degree of the outlet.

The air conditioner control method according to a fifth aspect of the present disclosure acquires environmental information of the interior of the vehicle in a vehicle interior environmental information acquisition step. Environmental information of surroundings of the vehicle is acquired in a vehicle exterior environmental information acquisition step. In a sensible temperature predicting step, a sensible temperature of an occupant of the vehicle after a predetermined amount of time has elapsed is predicted based on the information acquired by the vehicle interior environmental information acquisition step and the vehicle exterior environmental information acquisition step. In an air conditioning controlling step, an air conditioner is controlled based on a future sensible temperature of the occupant which has been predicted by the sensible temperature prediction unit and a comfortable sensible temperature of the occupant which is stored in a storage unit.

In the fifth aspect of the present disclosure, environmental information of the interior of the vehicle is acquired in the vehicle interior environment information acquisition step. Further, environmental information of surroundings of the vehicle is acquired in the vehicle exterior environmental information acquisition step. In addition, in the sensible temperature predicting step, the sensible temperature of the occupant of the vehicle after the predetermined amount of time has elapsed is predicted based on the information acquired by the vehicle interior environmental information acquisition step and the vehicle exterior environmental information acquisition step. By predicting the future sensible temperature of the occupant in this manner, it is possible to respond to environmental changes in advance.

Further, in the air conditioning controlling step, the air conditioner is controlled based on a future sensible temperature of the occupant which has been predicted by the sensible temperature prediction unit and a comfortable sensible temperature of the occupant which is stored in the storage unit. In this manner, by controlling the air conditioner in consideration of the comfortable sensible temperature in addition to the future sensible temperature of the occupant which has been predicted, the sensible temperature that the occupant feels comfortable can be maintained.

According to the first aspect of the present disclosure, the comfort of an occupant can be favorably maintained even when the environment changes.

According to the second aspect of the present disclosure, the comfort of an occupant can be further improved.

According to the third aspect of the present disclosure, the sensible temperature of an occupant can be accurately predicted even when the outside air temperature or the amount of solar radiation changes suddenly.

According to the fourth aspect of the present disclosure, even if the environment of the interior of the vehicle changes, the sensible temperature of an occupant can be accurately predicted.

According to the fifth aspect of the present disclosure, the comfort of an occupant can be favorably maintained even when the environment changes.

BRIEF DESCRIPTION OF THE DRAWINGS

Exemplary embodiment will be described in detail based on the following figures, wherein:

FIG. 4 is a table illustrating data used when a sensible temperature prediction unit in the exemplary embodiment generates a sensible temperature prediction model;

FIG. 5 is a table illustrating a history of a preferred sensible temperature of each user.

FIG. 6 is a flowchart illustrating an example of an air conditioning device control process in the exemplary embodiment.

DETAILED DESCRIPTION

Figure 1:
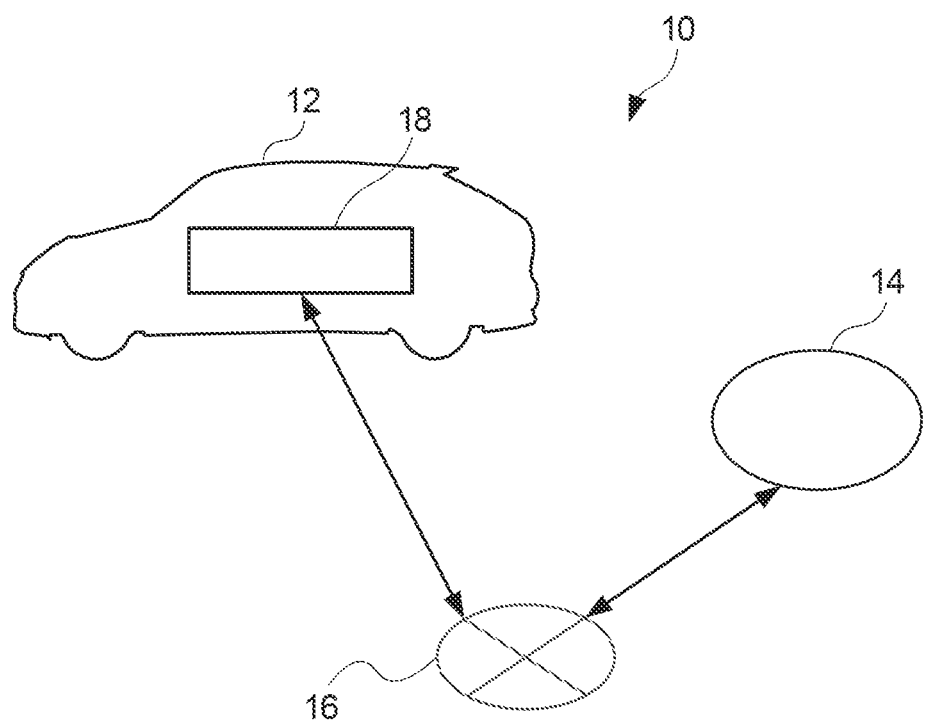
FIG. 1 is a diagram illustrating a schematic configuration of a vehicle air conditioning system according to an exemplary embodiment.

Explanation follows regarding a vehicle air condition system 10 according to an exemplary embodiment, with reference to the drawings. Note that the dimensional ratios in the drawings are exaggerated for convenience of explanation, and there are cases in which they differ from actual dimension ratios.

As illustrated in FIG. 1, the vehicle air conditioning system 10 includes a vehicle 12 and a server 14. The vehicle 12 and the server 14 are connected by a predetermined network 16.

The vehicle 12 of the present exemplary embodiment includes an ECU (Electronic Control Unit) 18. The vehicle 12 also includes an air conditioner 36 that blows temperature-controlled air into a vehicle interior, such as a passenger compartment, of the vehicle 12 (see FIG. 2).

The server 14 stores information such as the outside temperature, the humidity, and the amount of solar radiation for each unit. Further, the information accumulated in the server 14 is updated regularly.

(Hardware Configuration of Vehicle 12)

Figure 2:
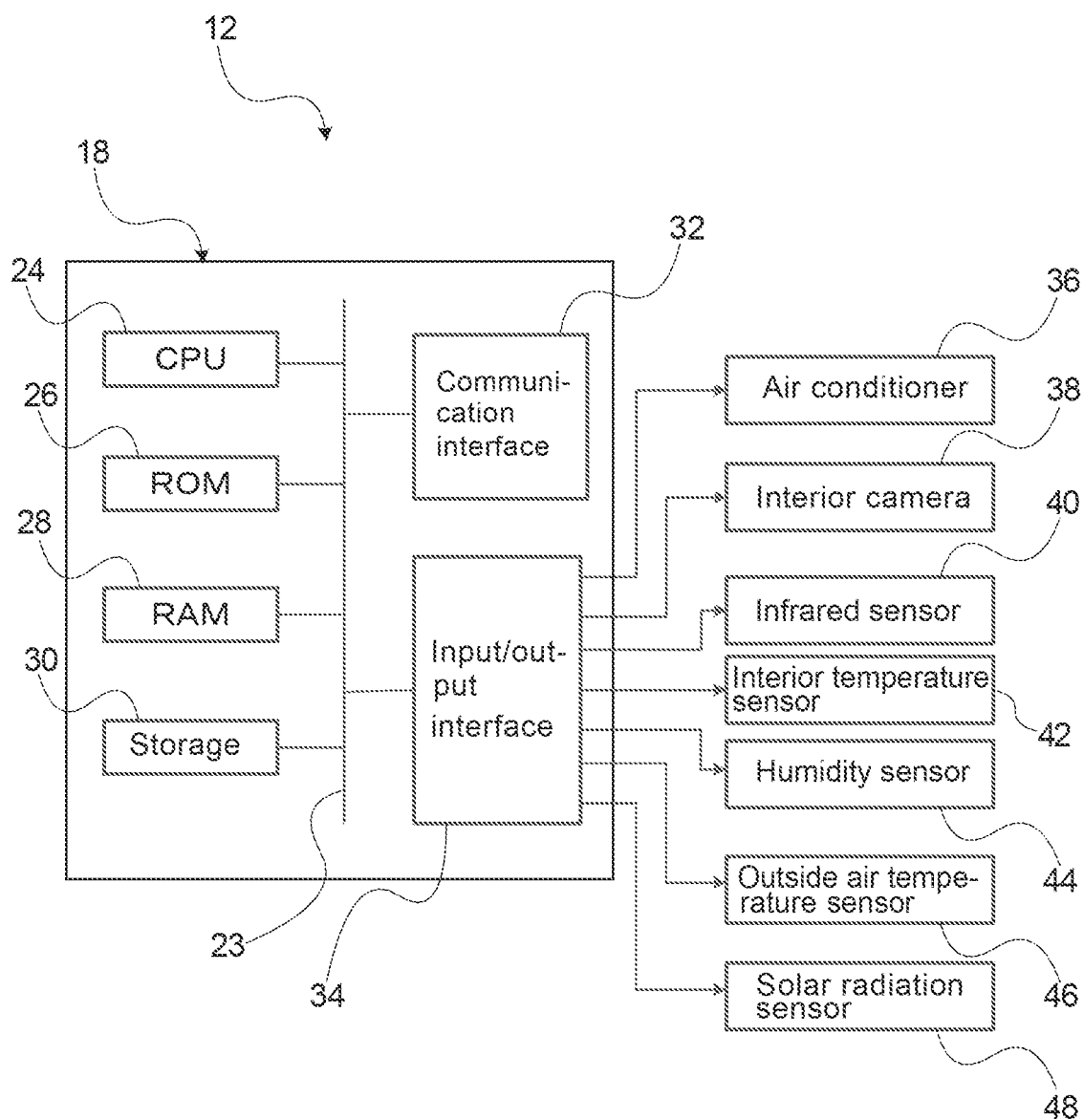
FIG. 2 is a block diagram illustrating a hardware configuration of a vehicle used in the vehicle air conditioning system according to the exemplary embodiment.

FIG. 2 is a block diagram illustrating the hardware configuration of the vehicle 12. As illustrated in FIG. 2, the ECU 18 of the vehicle 12 includes a CPU (Central Processing Unit) 24, a ROM (Read Only Memory) 26, a RAM (Random Access Memory) 28, a storage 30 as a storage unit, a communication interface 32, and an input/output interface 34. Each of these components is connected together so as to be capable of mutual communication via a bus 23. The CPU 24 is an example of a processor and the ROM 26, the RAM 28, and the storage 30 are examples of a memory.

The CPU 24 is a central computation processing unit that executes various programs and controls the respective sections. Namely, the CPU 24 reads out a program from the ROM 26 or the storage 30, and executes the program by using the RAM 28 as a work space. The CPU 24 controls the various configurations and performs various computation processing according to the program recorded in the ROM 26 or the storage 30.

The ROM 26 stores various programs and various data. The RAM 28 acts as a workspace for temporary storage of programs and data. The storage 30 is structured by an HDD (Hard Disk Drive) or an SSD (Solid State Drive), and various types of programs including the operating system, and various types of data are stored therein. In the present embodiment, the ROM 26 or the storage 30 stores a program for controlling the air conditioner 36, information regarding a comfortable sensible temperature for each user, and the like.

The communication interface 32 is an interface which the vehicle 12 uses to communicate with the server 14 and other devices, and, for example, employs a protocol such as Ethernet, LTE, FDDI, or Wi-Fi.

An air conditioner 36, an interior camera 38, an infrared sensor 40, an interior temperature sensor 42, a humidity sensor 44, an outside air temperature sensor 46, and a solar radiation sensor 48 are connected to the input/output interface 34. The air conditioner 36 is configured to include an HVAC (Heating, Ventilation, and Air Conditioning) unit. Further, the air conditioner 36 blows temperature-controlled air from a blower hole (not illustrated) provided in the vehicle interior. Further, the air conditioner 36 is configured so that the set temperature can be changed to an arbitrary temperature, and the air conditioner 36 is configured to blow air so that the temperature inside the vehicle interior approaches the set temperature.

The interior camera 38 is a camera that captures an image of the vehicle interior of the vehicle 12. In particular, the interior camera 38 of the present embodiment is configured to be able to capture an image of an occupant in the vehicle interior. Note that, in the present embodiment, as an example, one camera is capable of capturing images of all the occupants seated in seats in the vehicle interior, such as the passenger compartment, but the occupants may be captured by plurality cameras. In this case, the interior camera 38 may be configured to include a plurality of cameras.

The infrared sensor 40 is a sensor for detecting infrared rays emitted from an object inside the vehicle interior. In some embodiments, the infrared sensor 40 is used for measuring a skin temperature of the occupant in the vehicle interior. In some embodiments, the infrared sensor 40 may be an infrared camera configured to visualize infrared rays or a non-contact infrared thermometer or the like.

The interior temperature sensor 42 is a device for measuring the temperature inside the vehicle interior such as the passenger compartment. The humidity sensor 44 is a device for measuring the humidity inside the vehicle interior. The outside air temperature sensor 46 is a device for measuring an outside air temperature around the vehicle 12. The outside air temperature sensor 46 is provided, for example, in an outside air introduction section of the HVAC unit of the air conditioner 36.

The solar radiation sensor 48 is a device that measures the amount of energy emitted from the sun per unit time and per unit area.

(Functional Configuration of Vehicle 12)

The vehicle air conditioning system 10 realizes various functions by using the above hardware resources. The functional configuration that is realized by the vehicle 12 is explained with reference to FIG. 3.

Figure 3:
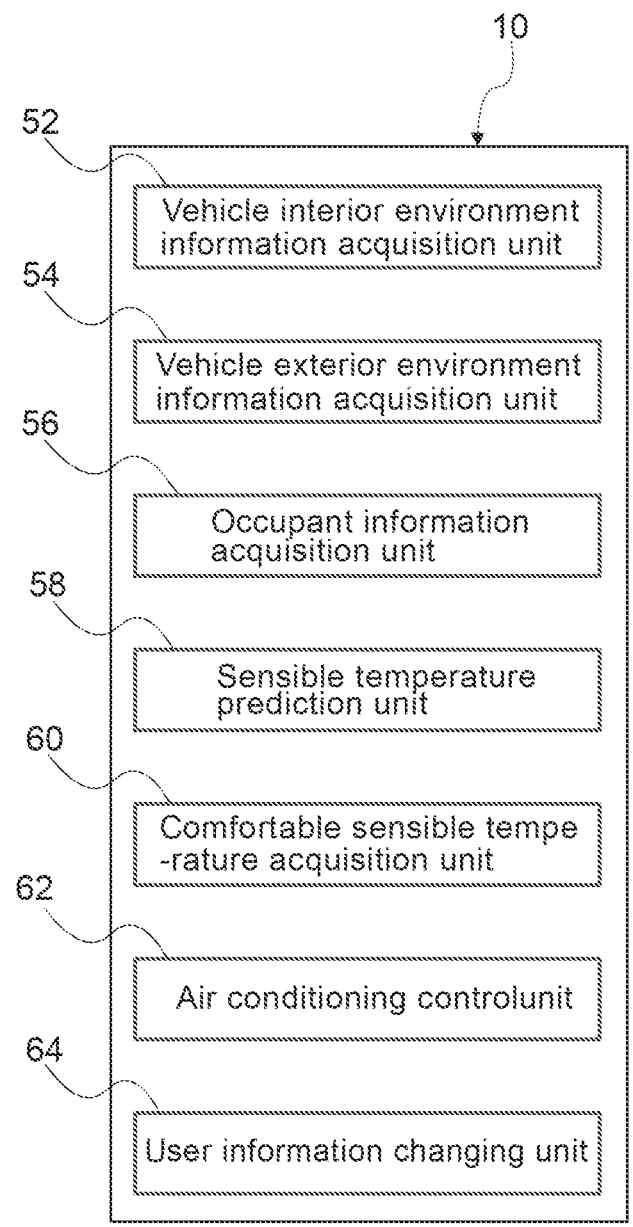
FIG. 3 is a block diagram illustrating a functional configuration of the vehicle air conditioning system according to the exemplary embodiment.

As illustrated in FIG. 3, the vehicle air conditioning system 10 has, as functional configurations, a vehicle interior environment information acquisition unit 52, a vehicle exterior environment information acquisition unit 54, an occupant information acquisition unit 56, a sensible temperature prediction unit 58, a comfortable sensible temperature acquisition unit 60, an air conditioning control unit 62, and a user information changing unit 64. These respective functional structures are realized by the CPU 24 reading out and executing programs that are recorded in the ROM 26 and the storage 30.

The vehicle interior environment information acquisition unit 52 acquires environment information of the vehicle interior. Specifically, the vehicle interior environment information acquisition unit 52 acquires the interior temperature measured by the interior temperature sensor 42 and the humidity measured by the humidity sensor 44. Further, the vehicle interior environment information acquisition unit 52 acquires information about the air conditioning set temperature of the air conditioner 36 and an inside/outside air state of the HVAC unit of the air conditioner 36. That is, the vehicle interior environment information acquisition unit 52 detects whether the HVAC unit of the air conditioner 36 is in an outside air introduction state or an inside air circulation state as the inside/outside air state, and acquires the inside/outside air state as the environment information of the vehicle interior. The vehicle interior environment information acquisition unit 52 may acquire an air conditioning air volume and an outlet state of the air conditioner 36 and the like as the environment information of the vehicle interior. Further, the vehicle interior environment information acquisition unit 52 may acquire a set temperature of a seat heater and an open/closed state of a window as the environment information of the vehicle interior. The state of the outlet of the air conditioner 36 refers to an opening degree of the outlet of the air conditioner 36.

The vehicle exterior environment information acquisition unit 54 acquires environment information around the vehicle 12. Specifically, the vehicle exterior environment information acquisition unit 54 acquires the outside air temperature around the vehicle 12 measured by the outside air temperature sensor 46 and the amount of solar radiation measured by the solar radiation sensor 48. In addition, the vehicle exterior environment information acquisition unit 54 may be configured to acquire the information regarding the weather acquired from the server 14 by the communication interface 32. Furthermore, the vehicle exterior environment information acquisition unit 54 may be configured to acquire time and position information, such as location of the vehicle 12.

The occupant information acquisition unit 56 acquires an amount of clothing and a metabolic rate of the occupant. Specifically, the occupant information acquisition unit 56 measures the amount of clothing from the image of the occupant captured by the interior camera 38. In the present embodiment, as an example, the occupant information acquisition unit 56 acquires the units of the amount of clothing. In the present embodiment, as an example, the occupant information acquisition unit 56 acquires the units of clothing amount as CLO.

Further, the occupant information acquisition unit 56 calculates the metabolic rate from a surface temperature of the occupant's skin that is measured by the infrared sensor 40, such as the infrared camera. In the present embodiment, as an example, the occupant information acquisition unit 56 acquires the units of metabolic rate as MET.

The sensible temperature prediction unit 58 predicts a sensible temperature of the occupant after a predetermined time has lapsed based on the information acquired by the vehicle interior environment information acquisition unit 52, the vehicle exterior environment information acquisition unit 54, and the occupant information acquisition unit 56. In the present embodiment, as an example, a sensible temperature prediction model is generated by performing multiple regression analysis or machine learning, and the sensible temperature is predicted by inputting predetermined data into this model.

When the sensible temperature prediction model is generated by multiple regression analysis, the information acquired by the vehicle interior environment information acquisition unit 52, the vehicle exterior environment information acquisition unit 54, and the occupant information acquisition unit 56 is set as explanatory variables. In addition, the sensible temperature when a current situation continues is set as an objective variable.

On the other hand, when a learned model of the sensible temperature prediction model is generated by performing machine learning, the information acquired by the vehicle interior environment information acquisition unit 52, the vehicle exterior environment information acquisition unit 54, and the occupant information acquisition unit 56 is input data. In addition, the sensible temperature prediction model is generated using teacher data for correctly labeling the sensible temperature when the current situation continues. As the learned model, for example, a deep neural network is applied. Further, a back propagation method is used to generate the learned model, for example.

It should be noted that the sensible temperature used here is a quantitative numerical value according to the information that can be acquired at the vehicle 12, and, for example, the operative temperature (OT: operative temperature) and the corrected humid operative temperature (HOTV: corrected humid operative temperature), and the standard new effective temperature (SET*: standard new effective temperature) or the like is used. The working temperature is the sensible temperature calculated by the air temperature, the air flow, and the radiation, and a corrected working temperature is the sensible temperature calculated by adding the humidity to the parameter of the working temperature. The standard new effective temperature is a sensible temperature calculated by adding the amount of clothing and the amount of metabolism to a parameter of corrected working temperature.

FIG. 4 illustrates an example of data used when generating the sensible temperature prediction model. As illustrated in FIG. 4, as an example in the present embodiment, the information acquired by the vehicle interior environment information acquisition unit 52, the vehicle exterior environment information acquisition unit 54, and the occupant information acquisition unit 56 for each of a number of times of travel, and the sensible temperature of the occupant is stored in at least one of the storage 30 and the server 14. Here, the sensible temperature is the sensible temperature when the numerical values of the data illustrated in the table are maintained for, for example, 15 minutes. In addition, in FIG. 4, the unit of the amount of solar radiation is $MJ/m^2$, the unit of temperature is Celsius, and the unit of humidity is relative humidity.

As illustrated in FIG. 3, the comfortable sensible temperature acquisition unit 60 acquires the comfortable sensible temperature of the occupant stored in the storage 30. In the present embodiment, as an example, the comfortable sensible temperatures of a plurality of occupants are stored in the storage 30. The comfortable sensible temperature acquisition unit 60 acquires the data of the occupant who is in the vehicle 12 from the stored data. It should be noted that the occupant is specified based on, for example, image data of the occupant captured by the interior camera 38. As another method, the occupant may directly input by operating the operation unit of the vehicle 12 or the like.

The air conditioning control unit 62 controls the air conditioner 36 based on a future sensible temperature of the occupant predicted by the sensible temperature prediction unit 58 and the comfortable sensible temperature acquired by the comfortable sensible temperature acquisition unit 60.

The user information changing unit 64 changes information about the comfortable sensible temperature of the occupant who is the user. That is, the information about the comfortable sensible temperature of the occupant stored in the storage 30 is periodically updated. It should be noted that since a face image is registered for each user, the user is specified by capturing an image of the occupant with the interior camera 38 when the occupant gets in the vehicle 12.

Here, FIG. 5 illustrates a history of the preferred sensible temperature of each user. As illustrated in FIG. 5, in the present embodiment, as one example, the history of ten comfortable sensible temperatures for three occupants is described. Then, when the occupant who is the user sets the air conditioner 36, the user information changing unit 64 updates the table of FIG. 5 according to the sensible temperature changed by the setting change.

(Operation)

Next, the operation of the present exemplary embodiment will be described.

(Air Conditioner Control Processing)

An example of the air conditioner control process for controlling the air conditioner 36 will be described with reference to the flowchart illustrated in FIG. 6. This air conditioner control process is executed by the ECU 18, specifically, the CPU 24 reading out the air conditioner control program from the ROM 26 or the storage 30, outputting it to the RAM 28, and executing it.

As illustrated in FIG. 6, the CPU 24 determines in step S102 whether or not the air conditioner 36 is turned on. If the air conditioner 36 is not turned on, that is, if the CPU 24 determines that the air conditioner 36 is turned off, the CPU 24 ends the air conditioner control process.

When the CPU 24 determines that the air conditioner 36 is turned on in step S102, the CPU 24 proceeds to the process of step S104 and acquires vehicle interior environment information (vehicle interior environment information acquisition step). Specifically, the CPU 24 uses the function of the vehicle interior environment information acquisition unit 52 to acquire the environment information of the vehicle interior from the interior temperature sensor 42 and the humidity sensor 44.

The CPU 24 acquires the vehicle exterior environment information in step S106 (vehicle exterior environment information acquisition step). Specifically, the CPU 24 uses the function of the vehicle exterior environment information acquisition unit 54 to acquire the environment information of the vehicle exterior from the outside air temperature sensor 46 and the solar radiation sensor 48.

Subsequently, the CPU 24 acquires occupant information in step S108. Specifically, the CPU 24 uses the function of the occupant information acquisition unit 56 to acquire occupant information from the interior camera 38, the infrared sensor 40, and the like.

Next, in step S110, it is determined whether or not there is data on the comfortable sensible temperature of the occupant. Specifically, when the occupant stored in the storage 30 is on board, the CPU 24 determines that there is occupant data, and proceeds to step S112. On the other hand, if the CPU 24 determines in step S110 that there is no passenger data, the CPU 24 proceeds to the processing of step S114 without performing the processing of step S112.

The CPU 24 corrects the sensible temperature in step S112. Specifically, the CPU 24 corrects the sensible temperature prediction model in consideration of the occupant's preference with reference to the table illustrated in FIG. 5. For example, when the comfortable sensible temperature that the occupant feels comfortable is lower than the standard sensible temperature, the sensible temperature prediction model is corrected so that the interior temperature in the vehicle interior decreases.

The CPU 24 controls the air conditioner 36 in step S114 (air conditioning control step). Specifically, the sensible temperature of the occupant is predicted by inputting the data acquired by the vehicle interior environment information acquisition unit 52, the vehicle exterior environment information acquisition unit 54, and the occupant information acquisition unit 56 to the sensible temperature prediction model (sensible temperature prediction step). Then, the air conditioner 36 is controlled according to the predicted future sensible temperature of the occupant. That is, the set temperature and the air volume of the air conditioner 36 are controlled according to the future sensible temperature of the occupant.

As described above, in the present embodiment, the vehicle interior environment information acquisition unit 52 acquires the environment information of the vehicle interior, and the vehicle exterior environment information acquisition unit 54 acquires the environment information around the vehicle 12. The sensible temperature prediction unit 58 predicts the sensible temperature of the occupant after a predetermined time has lapsed based on the information acquired by the vehicle interior environment information acquisition unit 52 and the vehicle exterior environment information acquisition unit 54. By predicting the future sensible temperature of the occupant in this way, it is possible to respond to environmental changes in advance.

In addition, in the present embodiment, the storage 30 stores information regarding the comfortable sensation temperature. Then, the air conditioning control unit 62 controls the air conditioner 36 based on the occupant's future sensible temperature predicted by sensible temperature prediction unit 58 and the information about the comfortable sensible temperature. As described above, by controlling the air conditioner 36 in consideration of the comfortable sensible temperature in addition to the predicted future sensible temperature of the occupant, the sensible temperature that the occupant feels comfortable can be maintained. That is, the comfort of the occupant can be favorably maintained even when the environment changes.

Furthermore, in the present embodiment, the occupant information acquisition unit 56 acquires the amount of clothing and the amount of metabolism of the occupant, and by adding these pieces of information, the sensible temperature of the occupant after a predetermined time has elapsed is predicted. Thereby, the setting of the air conditioner 36 can be changed according to the amount of clothing of the occupant, and the comfort of the occupant can be further improved.

Furthermore, in the present embodiment, at least one piece of information about the outside air temperature around the vehicle 12 and the amount of solar radiation is acquired as environmental information around the vehicle 12. Then, the future sensible temperature of the occupant is predicted based on these pieces of information. As a result, the sensible temperature of the occupant can be accurately predicted even when the outside air temperature and the amount of solar radiation change suddenly.

In addition, in the present embodiment, at least one piece of information on the vehicle interior temperature, the air conditioning set temperature, and the inside/outside air state is acquired as environmental information of the vehicle interior. Then, the future sensible temperature of the occupant is predicted based on these pieces of information. As a result, even if the environment inside the vehicle changes, the sensible temperature of the occupant can be accurately predicted.

Further, in the present embodiment, the user information changing unit 64 periodically changes the information on the user's comfortable sensible temperature. Therefore, the sensible temperature can be accurately predicted even when the physique of the user changes and the preference of the user changes.

Although the vehicle air conditioning system and the air conditioner control method according to the embodiment have been described above, it is needless to say that they can be implemented in various modes without departing from the scope of the present disclosure. For example, although the vehicle interior environment information acquisition unit 52 is configured to acquire information about the interior temperature measured by the interior temperature sensor 42, the humidity measured by the humidity sensor 44, the air conditioning set temperature of the air conditioner 36, and the inside/outside air state in the above embodiment, the present disclosure is not limited to this. That is, the vehicle interior environment information acquisition unit 52 may be configured to acquire at least one piece of information of the vehicle interior temperature, the air conditioning set temperature, the inside/outside air state, the air conditioning air flow, the outlet state, the humidity, the seat heater set temperature, and the window open/close state. Therefore, the vehicle interior environment information acquisition unit 52 may acquire only the interior temperature measured by the interior temperature sensor 42 as the environment information of the vehicle interior. However, from the viewpoint of accurately predicting the sensible temperature, the vehicle interior environment information acquisition unit 52 may acquire the information about the interior temperature, the humidity, the air conditioning set temperature, and the inside/outside air state. Further, from the viewpoint of more accurately predicting the sensible temperature, the vehicle interior environment information acquisition unit 52 may acquire information on the air conditioning air volume, the outlet state, the seat heater set temperature, and the window open/closed state.

Further, in the above embodiment, the vehicle exterior environment information acquisition unit 54 is configured to acquire the outside air temperature around the vehicle 12 measured by the outside air temperature sensor 46 and the solar radiation amount measured by the solar radiation sensor 48, but is not limited to this. That is, the vehicle exterior environment information acquisition unit 54 may acquire at least one piece of information of the outside air temperature around the vehicle, the amount of solar radiation, the time, and the position information. Therefore, the vehicle exterior environment information acquisition unit 54 may acquire only the outside air temperature around the vehicle 12 measured by the outside air temperature sensor 46 as the vehicle exterior environment information. However, the vehicle exterior environment information acquisition unit 54 may acquire the outside air temperature and the amount of solar radiation from the viewpoint of accurately predicting the sensible temperature. Further, from the viewpoint of more accurately predicting the sensible temperature, a change in the amount of solar radiation may be predicted from the time and position information of the vehicle 12. Since the amount of solar radiation changes depending on the season, the change in the amount of solar radiation may be predicted by adding date information.

Further, in the above embodiment, the sensible temperature prediction unit 58 predicts the sensible temperature of the occupant after a predetermined time has lapsed based on the data acquired by the vehicle interior environment information acquisition unit 52, the vehicle exterior environment information acquisition unit 54, and the occupant information acquisition unit 56, but is not limited to this. For example, the sensible temperature prediction unit 58 does not have to consider the data acquired by the occupant information acquisition unit 56. In this case, the sensible temperature prediction unit 58 may predict the sensible temperature of the occupant after a predetermined time has lapsed based on the data acquired by the vehicle interior environment information acquisition unit 52 and the vehicle exterior environment information acquisition unit 54. However, from the viewpoint of accurately predicting the sensible temperature, the sensible temperature of the occupant after a predetermined time has lapsed may be predicted based on the data acquired by the vehicle interior environment information acquisition unit 52, the vehicle exterior environment information acquisition unit 54, and the occupant information acquisition unit 56.

Furthermore, when generating the sensible temperature prediction model, data unique to each vehicle type may be taken into consideration. For example, the sensible temperature prediction model may be generated in consideration of the body color, the side glass color, the presence or absence of a sunroof, and the like of the vehicle 12.

Note that any of various types of processors other than the CPU 24 may execute the air conditioner control processing that the CPU 24 executes by reading out the programs in the above-described embodiment. Examples of such processors include programmable logic devices (PLD) with circuit configurations that are reconfigurable after manufacture, such as field-programmable gate arrays (FPGA), and dedicated electronic circuits that are processors including circuit configurations custom designed to execute specific processing, such as application specific integrated circuits (ASIC) or the like. The air conditioner control process may be executed by one of these various processors, or may be executed by a combination of two or more processors of the same type or different types. More specific examples of hardware structures of such processors include electric circuits configured by combining circuit elements such as semiconductor devices.

Moreover, in the above exemplary embodiment, the storage 30 serves as a recording section, but there is no limitation thereto. A recording medium such as, for example, a CD (Compact Disk), a DVD (Digital Versatile Disk), a USB (Universal Serial Bus) memory, or the like may be made to be the recording section. In this case, various programs and data are stored in these recording media.

The present disclosure is not limited to the exemplary embodiment described above, and obviously various other modifications may be implemented within a range not departing from the spirit of the present disclosure.

What is claimed is:

1. A vehicle air conditioning system, comprising:
a memory; and
a processor coupled to the memory, the processor is configured to:
acquire environmental information of an interior of a vehicle;
acquire environmental information of surroundings of the vehicle;
acquire information of a setting temperature of a seat heater;
predict a sensible temperature of an occupant of the vehicle after a predetermined amount of time has elapsed, based on the acquired environmental information of the interior of the vehicle, the acquired environmental information of surroundings of the vehicle, and the acquired information of the setting temperature of the seat heater; and
control an air conditioner based on information regarding the predicted sensible temperature of the occupant and a comfortable sensible temperature of the occupant which is stored in a storage unit.

2. The vehicle air conditioning system according to claim 1, wherein the processor is configured to:
acquire information of at least one of an amount of clothing of the occupant or a metabolic rate of the occupant; and
predict the sensible temperature of the occupant after the predetermined amount of time has elapsed, based on the acquired information of the at least one of the amount of clothing of the occupant or the metabolic rate of the occupant.

3. The vehicle air conditioning system according to claim 1, wherein the processor is configured to acquire information of at least one of an air temperature outside the vehicle, an amount of solar radiation, or information indicating time and location of the vehicle; and
predict the sensible temperature of the occupant after the predetermined amount of time has elapsed, based on the acquired information of the at least one of the air temperature outside the vehicle, the amount of solar radiation, or the information indicating time and location of the vehicle.

4. The vehicle air conditioning system according to claim 1, wherein the processor is configured to acquire information of at least one of a temperature of the interior of the vehicle, an air conditioning setting temperature, a state of air inside and outside the vehicle, an air conditioning air flow, a state of an outlet, a humidity of the interior of the vehicle, or an open/closed state of a window; and
predict the sensible temperature of the occupant after the predetermined amount of time has elapsed, based on the acquired information of the at least one of the temperature of the interior of the vehicle, the air conditioning setting temperature, the state of air inside and outside the vehicle, the air conditioning air flow, the state of the outlet, the humidity of the interior of the vehicle, or the open/closed state of the window.

5. The vehicle air conditioning system according to claim 1, wherein the processor is configured to predict the sensible temperature of the occupant after the predetermined amount of time has elapsed, based on a body color of the vehicle, a color of side glass of the vehicle, and whether or not the vehicle has a sunroof.

6. An air conditioner control method comprising:
acquiring, by a processor, environmental information of an interior of a vehicle;
acquiring, by a processor, environmental information of surroundings of the vehicle;
acquiring, by a processor, information of a setting temperature of a seat heater;
predicting, by a processor, a sensible temperature of an occupant of the vehicle after a predetermined amount of time has elapsed, based on the acquired environmental information of the interior of the vehicle and the acquired environmental information of the surroundings of the vehicle; and controlling, by a processor, an air conditioner based on information regarding the predicted sensible temperature of the occupant, a comfortable sensible temperature of the occupant which is stored in a storage unit, and the acquired information of the setting temperature of the seat heater.

\* \* \* \* \*